United States Patent
Jeong et al.

(10) Patent No.: US 7,643,815 B2
(45) Date of Patent: Jan. 5, 2010

(54) APPARATUS AND METHOD FOR AUTOMATICALLY DETECTING PRESENCE OF STROBO IN MOBILE TERMINAL

(75) Inventors: Kil-Ho Jeong, Ichon-shi (KR); Cheul-Hong Kim, Ichon-shi (KR)

(73) Assignee: Pantech & Curitel Communications, Inc., Seoul (KR)

( * ) Notice: Subject to any disclaimer, the term of this patent is extended or adjusted under 35 U.S.C. 154(b) by 975 days.

(21) Appl. No.: 10/749,788

(22) Filed: Dec. 30, 2003

(65) Prior Publication Data

US 2004/0209647 A1 Oct. 21, 2004

(30) Foreign Application Priority Data

Apr. 17, 2003 (KR) .................. 10-2003-0024455

(51) Int. Cl.
*H05K 11/00* (2006.01)
*H04B 1/38* (2006.01)

(52) U.S. Cl. ....................... 455/344; 455/557

(58) Field of Classification Search ................. 455/344, 455/347, 348, 349, 350, 351, 557, 569.1, 455/575.1, 575.2, 90.1, 90.2, 90.3, 556.1
See application file for complete search history.

(56) References Cited

U.S. PATENT DOCUMENTS

| | | | | |
|---|---|---|---|---|
| 4,792,986 A | * | 12/1988 | Garner et al. | 455/90.2 |
| 5,596,638 A | * | 1/1997 | Paterson et al. | 455/575.2 |
| 6,122,369 A | * | 9/2000 | Hwang et al. | 455/569.1 |
| 6,594,366 B1 | * | 7/2003 | Adams | 455/575.2 |
| 6,819,942 B2 | * | 11/2004 | Aotake et al. | 455/556.1 |
| 6,961,591 B2 | * | 11/2005 | Osano | 455/569.1 |
| 2003/0013484 A1 | | 1/2003 | Nishimura et al. | |
| 2003/0104842 A1 | | 6/2003 | Choi et al. | |
| 2003/0181200 A1 | | 9/2003 | Iida | |
| 2003/0216151 A1 | | 11/2003 | Kitano et al. | |
| 2003/0229723 A1 | | 12/2003 | Kangas et al. | |

FOREIGN PATENT DOCUMENTS

| | | | |
|---|---|---|---|
| EP | 1199867 A1 | * | 4/2002 |
| JP | 2003-032333 | | 1/2003 |
| KR | 20-0276068 | | 5/2002 |
| KR | 2002-0079717 | | 10/2002 |

* cited by examiner

*Primary Examiner*—Quochien B Vuong
(74) *Attorney, Agent, or Firm*—H.C. Park & Associates, PLC

(57) ABSTRACT

Disclosed is an apparatus and method for automatically detecting the presence of a strobo in an earphone jack port of a mobile terminal wherein the strobo is automatically enabled without the additional operation of the mobile terminal when the strobo is plugged into an earphone jack while a user uses a built-in digital camera. The present invention safeguards the mobile terminal against severe damage being done thereto by mistakenly choosing options to enable a strobo without knowing that an earphone/microphone set is plugged in the earphone jack of a mobile terminal.

11 Claims, 3 Drawing Sheets

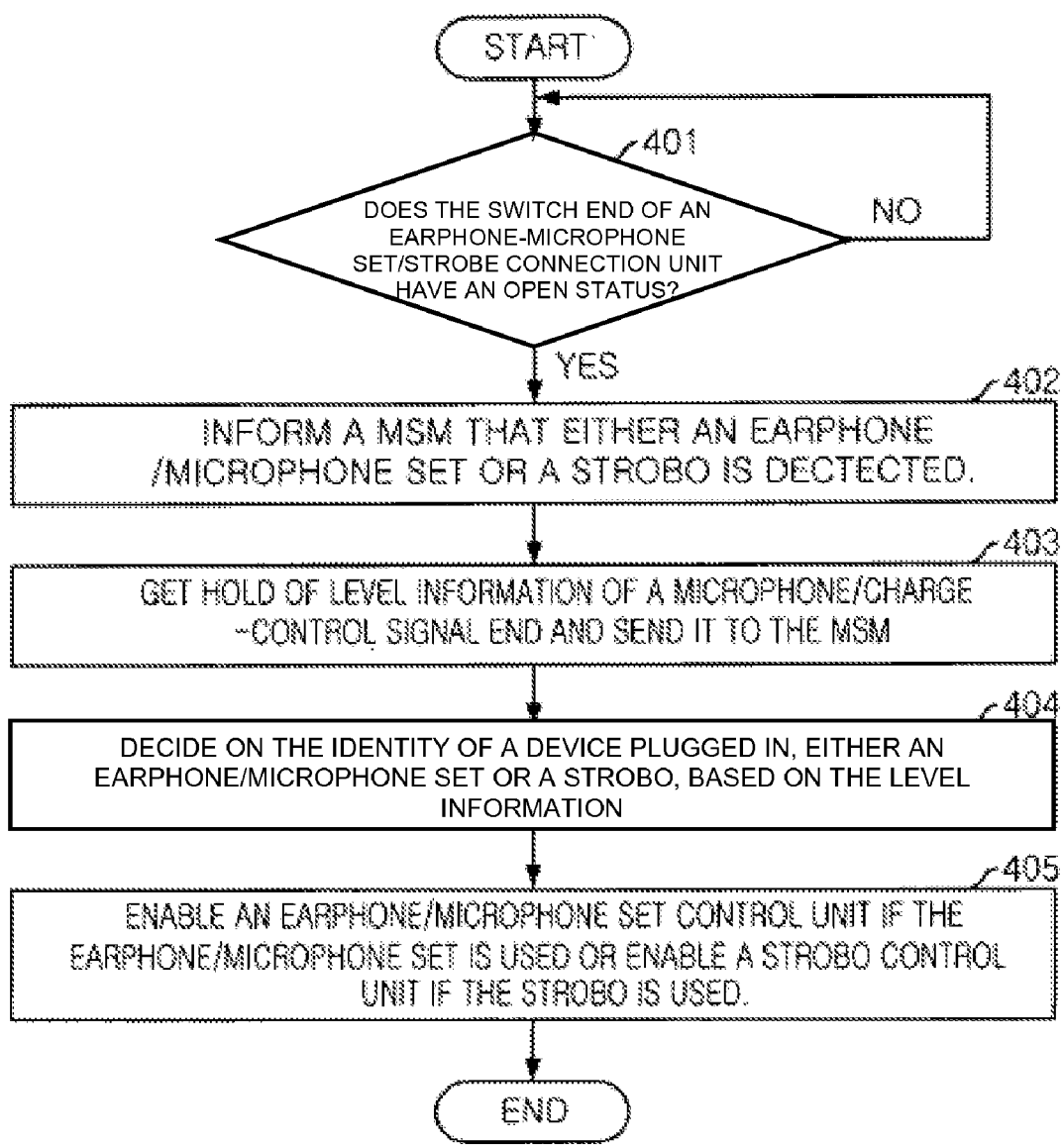

APPARATUS AND METHOD FOR AUTOMATICALLY DETECTING PRESENCE OF STROBO IN MOBILE TERMINAL

CROSS REFERENCE TO RELATED APPLICATION

This application claims priority from and the benefit of Korean Patent Application No. 2003-24455, filed on Apr. 17, 2003, which is hereby incorporated by reference for all purposes as if fully set forth herein.

FIELD OF THE INVENTION

The present invention relates to an apparatus and method for automatically detecting the presence of a strobo in a mobile terminal; and, more particularly, to an apparatus and method for automatically detecting the presence of a strobo in an earphone jack port of a mobile terminal wherein the strobo is automatically enabled without the additional operation of the mobile terminal when the strobo is plugged into the earphone jack port while a user uses a built-in digital camera.

DESCRIPTION OF RELATED ART

The mobile terminal includes all portable terminals capable of sending and receiving sound, characters and images through mobile channels, for example, a Personal Communication Services (PCS) end, Personal Digital Assistant (PDA) and Smart phone.

Nowadays, most mobile terminals currently on the market have a built-in color Liquid Crystal Display (LCD), making a wide variety of additional functions available to the public. Furthermore, a mobile terminal having a built-in digital camera is now commonplace, largely because a color LCD can be best put into practice in the photograph-related industry.

Until recently, users in general played only a passive role in making choices between functions available in a mobile terminal. Now, it is often the case that the mobile terminal having the built-in digital camera enables a user to capture any image of his choice as well as to transmit an image of his own anytime anywhere to anyone.

On the other hand, as for the use of a built-in digital camera, a device called a strobo comes in handy when the luminescence of a place at which a photograph is to be taken is not suitable for the picture-taking purpose. However, most mobile terminals having the built-in digital camera currently on the market are not equipped with such strobo. It is partly due to a widely-held fallacy that the size of a mobile terminal matters more to consumers than its functionality and practicality when it comes to deciding on what to purchase.

Accordingly, current trends are such that external strobos are widely in use. The standard course of action in using the external strobo is described as follows. First, options of choice for the use of the external strobo are set. Then, the strobo is plugged in the earphone jack, bearing in mind that the earphone jack is designed to accept a connection from an earphone.

However, considerable inconvenience may be caused by having to go through the same set-up process all over again when using an external strobo. In addition to the above, an electric surge caused by mistakenly choosing options to activate a strobo when an earphone/microphone set is plugged in an earphone jack instead could do extensive damage to a mobile terminal.

SUMMARY OF THE INVENTION

It is, therefore, an object of the present invention to provide an apparatus and method for automatically detecting the presence of a strobo in an earphone jack of a mobile terminal wherein the strobo is automatically enabled without the additional operation of the mobile terminal when the strobo is plugged into the earphone jack port while a user uses a built-in digital camera.

In accordance with an aspect of the present invention, there is provided an apparatus for automatically detecting the presence of a strobo in an earphone jack port of a mobile terminal, the apparatus including: a connection unit for electrically connecting an earphone/microphone set or a strobo to the mobile terminal and generating level information if one of an earphone/microphone set or a strobo is connected to the mobile terminal; a sense unit for determining whether the earphone/microphone set or the strobo is electrically connected to the connection unit according to the level information and generating an indication signal containing a determination result; a main process unit for generating a control signal to control the earphone/microphone set or the strobo according the indication signal; and a strobo control unit for controlling strobo by receiving the control signal from the main process unit.

In accordance with another aspect of the present invention, there is provided a method for automatically detecting the presence of a strobo in an earphone jack port of a mobile terminal, the method including the steps of: a) obtaining level information from a connection unit; b) determining whether an earphone/microphone set or a strobo is electrically connected to the connection unit according to the level information; c) enabling a strobo control unit if the strobo is electrically connected to the connection unit as a determination result of step b); and d) enabling the earphone/microphone set control unit if the earphone/microphone set is electrically connected to the connection unit as a determination result of step b).

BRIEF DESCRIPTION OF THE DRAWINGS

The above and other objects and features of the present invention will become apparent from the following description of the preferred embodiments given in conjunction with the accompanying drawings, in which:

FIG. 4 is a flow chart illustrating a method for automatically detecting the presence of a strobo in an earphone jack port of a mobile terminal.

DETAILED DESCRIPTION OF THE INVENTION

Other objects and aspects of the invention will become apparent from the following description of the embodiments with reference to the accompanying drawings, which is set forth hereafter.

Figure 1:
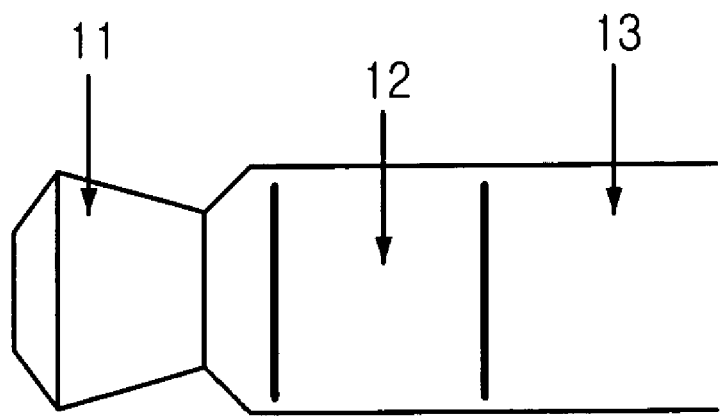
FIG. 1 is a perspective view of an earphone/microphone set plug capable of electrically connecting an earphone/microphone set to an earphone jack in a mobile terminal in accordance with an embodiment of the present invention.

FIG. 1 is a perspective view of an earphone/microphone set plug capable of electrically connecting an earphone/microphone set to an earphone jack in a mobile terminal in accordance with an embodiment of the present invention.

Referring to FIG. 1, an earphone/microphone set plug includes a microphone end 11, a speaker end 12 and a ground end 13.

The microphone end 11 is designed to transmit a voice signal through the microphone/charge-control signal end of the earphone jack on a mobile terminal with a built-in digital camera. The speaker end 12 receives the voice signal via the speaker/shot control end of the earphone jack on the mobile terminal. The ground end 13 is connected to a ground end of an earphone jack on the mobile terminal.

Figure 2:
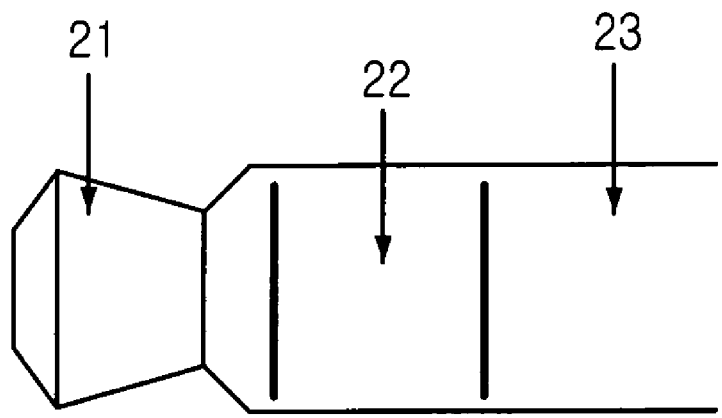
FIG. 2 is a perspective view of a strobo plug to be plugged in an earphone jack in a mobile terminal in accordance with an embodiment of the present invention.

FIG. 2 is a perspective view of a strobo plug to be plugged in an earphone jack in a mobile terminal according to the present invention.

Referring to FIG. 2, the strobo plug includes a charge-control signal end 21, a shot end 22 and a ground end 23.

The charge-control signal end 21 comes into contact with the microphone/charge-control signal end of the earphone jack on the mobile terminal to perform a charging-up process. The shot end 22 receives the shot signal to perform the discharge of electricity. The shot end 22 is controlled by a Mobile Station Modem (MSM) and is connected to the speaker/shot control end of the earphone jack on the mobile terminal. The ground end 23 is connected to the ground end of the earphone jack on the mobile terminal.

Figure 3:
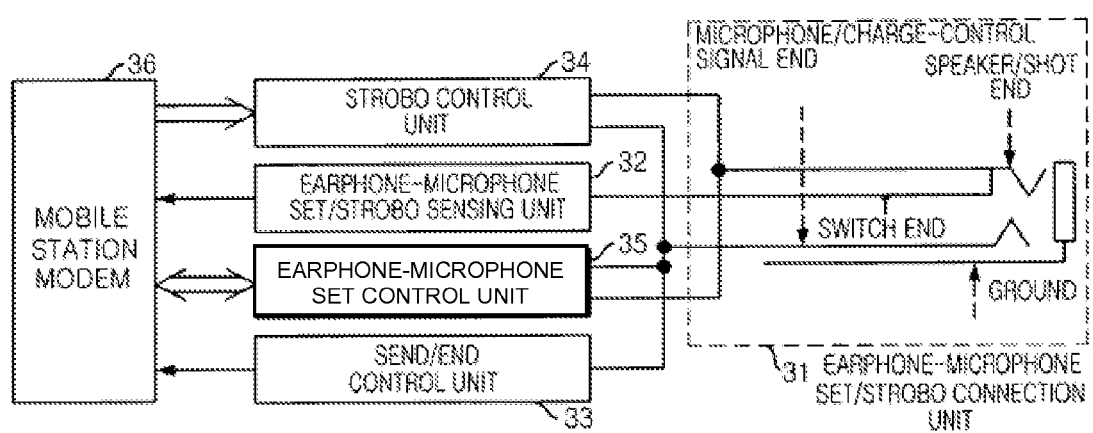
FIG. 3 is a block diagram of an apparatus for automatically detecting the presence of a strobo in an earphone jack port of a mobile terminal in accordance with an embodiment of the present invention.

FIG. 3 is a block diagram of an apparatus for automatically detecting the presence of a strobo in an earphone jack port of a mobile terminal according to the present invention.

Referring to FIG. 3, the apparatus includes an earphone-microphone set/strobo connection unit 31 and an earphone-microphone set/strobo sensing unit 32, a send/end control unit 33 and a mobile station modem 36. The earphone-microphone set/strobo connection unit 31 includes a microphone/charge-control signal end, a speaker/shot end, a switch end and a ground end.

The microphone/charge-control signal end provides a connection to either the charge-control signal end 21 of a strobo plug or the microphone end 11 of an earphone/microphone set plug. The speaker/shot end provides a connection to either the shot end 22 of a strobo plug or the speaker end 12 of an earphone/microphone set plug. The switch end functions as an open-closed switch. The earphone-microphone set/strobo connection unit 31 with a ground end provides a connection to either the ground end 23 of a strobo plug or the ground end 13 of an earphone/microphone set plug. The earphone-microphone set/strobo connection unit 31 functions as a coupling of an earphone/microphone set plug and a strobo plug.

In addition, the apparatus further includes an earphone-microphone set/strobo sensing unit 32, a send/end control unit 33, a strobo control unit 34, an earphone/microphone set control unit 35, and the MSM 36.

The earphone-microphone set/strobo sensing unit 32 detects which of the following, an earphone/microphone set or a strobo, is connected to the earphone-microphone set/strobo connection unit 31, based on the open-closed status of a switch end. The detection result is forwarded to the MSM 36. The send/end control unit 33 processes a signal indicating the beginning and the end of a phone call. The send/end control unit 33 passes the level information on to the MSM 36. The strobo control unit 34 controls a strobo in accordance with either a charge-control signal or a shot signal transmitted from the MSM 36 based on the level information obtained from a microphone/charge-control signal end. The earphone/microphone set control unit 35 redirects a voice signal emitted by the MSM 36 to the speaker end 12 of an earphone/microphone set. Here, upon receiving a signal from the send/end control unit 33, the MSM 36 finds out about when a phone call begins or ends based on the level information. The earphone/microphone set control unit 35 redirects a signal received from a microphone end 11 of the earphone/microphone set to the MSM 36. The MSM 36 receives a signal indicating which of the following, namely an earphone-microphone set or a strobo, is connected to the earphone-microphone set/strobo connection unit 31. Upon receipt of the level information from a send/end control unit 33, the MSM 36 accordingly enables either the strobo control unit 34 or the earphone/microphone set control unit 35.

FIG. 4 is a flow chart illustrating a method for automatically detecting the presence of a strobo in an earphone jack port of a mobile terminal.

First, at step S401, an earphone-microphone set/strobo sensing unit 32 determines if a switch end of an earphone-microphone set/strobo connection unit 31 has an open status. The switch end waits until it has an open status. When neither an earphone/microphone set nor a strobo is present in the earphone jack port, the switch end is said to have a closed status. On the other hand, at step S402, the earphone-microphone set/strobo sensing unit 32 informs the mobile station modem 36 that one of the following, an earphone/microphone set or a strobo, is connected to the earphone-microphone set/strobo connection unit 31.

Then, at step S403, a send/end control unit 33 sends out level information to a mobile station modem 36, where the level information is obtained from the microphone/charge-control signal end of the earphone-microphone set/strobo connection unit 31. Following on from the above, at step S404, the mobile station modem 36 decides on the identity of a device being plugged into the earphone jack port, namely an earphone/microphone set or a strobo, based on the level information obtained from the send/end control unit 33.

Depending on the identity of the device being plugged into the earphone jack port, at step S405, the mobile station modem 36 enables a strobo control unit 34 to control the strobo if a strobo is plugged into the earphone jack port. The mobile station modem 36 enables an earphone/microphone set control unit 35 to control the earphone/microphone set if an earphone/microphone set is plugged.

Here, going into a little more detail about the decision-making methodology used by a mobile station modem 36 at the step S404, the identity of a device being plugged into the earphone jack of the mobile is decided upon based on level information. When a strobo is connected to the earphone-microphone set/strobo connection unit 31, a low level, 0.5 V, results. This is largely due to the impedance characteristic of the interior charge circuit of a strobo. On the contrary, a high level of voltage, DC voltage ranging from 2.7V to 3.0V, results if an earphone/microphone set is plugged into the earphone jack port.

Assume that the identity of a device connected to the earphone-microphone set/strobo connection unit 31 is found to be an earphone-microphone set. Assume that a user enables the send/end control unit 33 so as to make a phone call, thereby sending out signals carrying a low level status to a mobile station modem 36.

Upon receipt of a signal with a low level status, the mobile station modem 36 enables the earphone/microphone set control unit 35 without being misled into enabling the strobo control unit 34. This is largely owing to the fact that the mobile station modem 36 is already aware that an earphone-microphone set/strobo connection unit 31 is connected with an earphone-microphone set.

In addition, the present invention can be applied to existing mobile terminals in such a way that a user can make a phone call with much ease using the built-in speaker and the built-in microphone of the mobile terminals and an earphone-microphone set.

The effect of the present invention as described in the above is explained here in such a way that the use of a strobo is enabled via the earphone jack of a mobile terminal while being compatible with existing mobile terminals in relation to making a phone call through a built-in speaker and a built-in microphone thereof as well as an earphone/microphone set.

The mobile terminal is safeguarded against severe damage being done thereto by mistakenly choosing options to activate a strobo without knowing that an earphone/microphone set is plugged in the earphone jack of a mobile terminal.

While the present invention has been described with respect to certain preferred embodiments, it will be apparent to those skilled in the art that various changes and modifications may be made without departing from the scope of the invention as defined in the following claims.

What is claimed is:

1. An apparatus for automatically detecting the presence of an external device in an earphone jack port of a mobile terminal, the apparatus comprising:
    a connection unit to electrically connect an earphone/microphone set or an external device to the mobile terminal, and to send level information according to whether the earphone/microphone set or the external device is connected to the mobile terminal, wherein the level information has a first voltage level if the earphone/microphone set is connected to the mobile terminal and a second voltage level if the external device is connected to the mobile terminal;
    a switch end to identify that the earphone/microphone set or the external device is electrically connected to the connection unit if the switch end is open;
    a sensor to determine whether the earphone/microphone set or the external device is electrically connected to the connection unit according to the voltage level of the level information and to generate an indication signal containing a determination result;
    a main processor to generate a control signal to control the earphone/microphone set or the external device according to the indication signal; and
    an external device controller to control the external device, if the external device is connected to the mobile terminal, by receiving the control signal from the main processor,
    wherein the external device controller enables the connected external device automatically if the external device is connected to the connection unit.

2. The apparatus as recited in claim 1, further comprising:
    a call controller to generate a call signal indicating whether the mobile terminal is used for originating a call; and
    an earphone/microphone set controller to control an earphone/microphone set to pass a voice signal to a voice input/output unit in the mobile terminal according to the voltage level of the level information and the call signal.

3. The apparatus as recited in claim 2, wherein the main processor generates the control signal to enable the earphone/microphone set controller if the indication signal represents that the earphone/microphone set is connected to the connection unit.

4. The apparatus as recited in claim 1, wherein the main processor generates the control signal to enable the external device controller if the indication signal represents that the external device is connected to the connection unit, and generates a shot signal and a charge control signal.

5. The apparatus as recited in claim 4, wherein the external device controller controls the external device according to the shot signal and the charge control signal from the main processor.

6. The apparatus as recited in claim 1, wherein the connection unit includes:
    a microphone/charge-control signal end to provide a connection to either a microphone end of a earphone/microphone set plug or a charge-control signal end of an external device plug;
    a speaker/shot end to provide a connection to either a speaker end of the earphone/microphone set plug or a shot end of the external device plug; and
    a ground end to provide a connection to either a ground end of the earphone/microphone set plug or a ground end of the external device plug.

7. The apparatus as recited in claim 1, wherein the external device is a strobo, wherein the external device controller enables the connected strobo automatically if the strobo is connected to the connection unit and a digital camera is used.

8. The apparatus of claim 1, wherein the first voltage level is 2.7 volts to 3.0 volts, and the second voltage level is 0.5 volts.

9. A method for automatically detecting the presence of an external device in an earphone jack port of a mobile terminal, the method comprising the steps of:
    a) detecting that a switch end is in an open position to indicate that an earphone/microphone set or the external device is connected to the mobile terminal, and obtaining level information from a connection unit, wherein the level information has a first voltage level if the earphone/microphone set is connected to the mobile terminal and a second voltage level if the external device is connected to the mobile terminal;
    b) determining whether the earphone/microphone set or the external device is electrically connected to the connection unit according to the voltage level of the level information;
    c) enabling an external device control unit if the external device is electrically connected to the connection unit; and
    d) enabling an earphone/microphone set control unit if the earphone/microphone set is electrically connected to the connection unit.

10. The method of claim 9, wherein the external device is a strobo.

11. The method of claim 9, wherein the first voltage level is 2.7 volts to 3.0 volts, and the second voltage level is 0.5 volts.

* * * * *

UNITED STATES PATENT AND TRADEMARK OFFICE
CERTIFICATE OF CORRECTION

PATENT NO.      : 7,643,815 B2                                        Page 1 of 1
APPLICATION NO. : 10/749788
DATED           : January 5, 2010
INVENTOR(S)     : Jeong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1317 days.

Signed and Sealed this

Sixteenth Day of November, 2010

David J. Kappos
*Director of the United States Patent and Trademark Office*